United States Patent Office  3,720,700
Patented Mar. 13, 1973

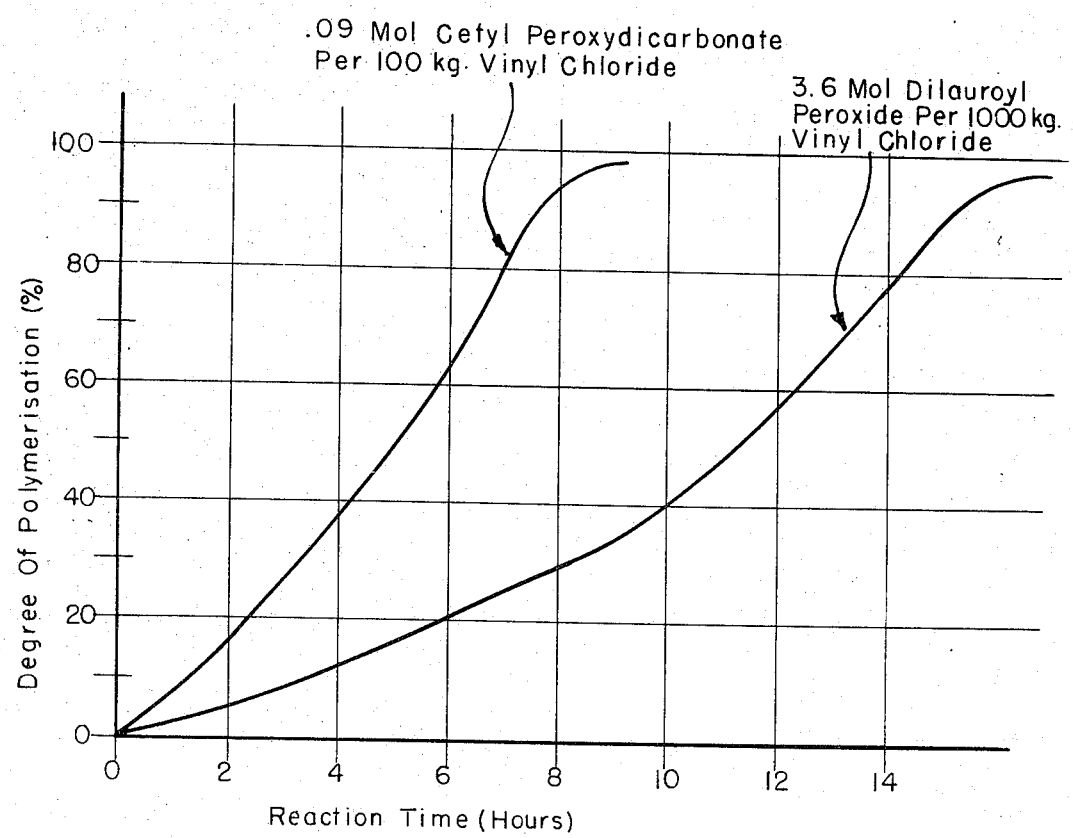

3,720,700
DI-CETYL PEROXY DICARBONATE
Hakan Norback, Danderyd, Sweden, assignor to Kema Nord AB, Stockholm, Sweden
Filed Nov. 14, 1969, Ser. No. 876,802
Int. Cl. C07c *73/10;* C09f *1/60*
U.S. Cl. 260—463   1 Claim

ABSTRACT OF THE DISCLOSURE

The chemical compound di-cetyl peroxydicarbonate having the structural formula

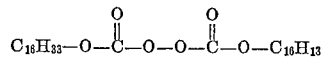

as well as its method of production and its use as an initiator in the polymerization of unsaturated compounds such as vinyl chloride or other ethylenically unsaturated monomers.

BACKGROUND

It is known that compounds such as di-isopropyl-, di-n-butyl-, di-cyclohexyl- and di-tertiary-butyl cyclohexyl peroxydicarbonate are efficient initiators for the polymerization of unsaturated compounds such as ethylene, methyl, methacrylate, vinyl chloride, vinylidene chloride, vinyl acetate, acrylamide, allyl chloroformate, and styrene. See for instance Dunn et al. Pat. No. 2,843,576 and Marous et al. Reissue Pat. No. 25,763.

However, these known initiators have several disadvantages. First of all, their stability to decomposition is poor. Concentrated di-isopropyl peroxydicarbonate decomposes explosively at room temperature and other known peroxydicarbonates have, in a varying degree, poor storage stability. As a result considerable disadvantages and risks are involved in handling this type of initiator.

Thus, distribution of the initiator from the manufacturer to the consumer usually has to be carried out by means of refrigerated transportation. Also, storage rooms at the point of use have to be adjusted to the thermosensibility of these compounds. Special precautions measures have to be taken to prevent fire in the storage rooms.

Another serious disadvantage of the hitherto used peroxydicarbonates (such as di-isopropyl- and di-tertiary-butylcyclohexyl-peroxydicarbonate) is their tendency to form so called "fish eyes." For instance when suspension polymerization of vinyl chloride is carried out with the aforesaid initiators is carried out, a fraction of the polyvinyl chloride granules that are obtained have a size of about 100 millimicrons and have a relatively compact porous inner structure. When calendering such polyvinyl chloride granules with a plasticizer, the plasticizer cannot penetrate into these compact granules, so that they do not dissolve and will remain as small globules in the formed plastic product. These globules are called "fish eyes." These "fish eyes" render the resin entirely unfit for certain purposes, such as for tile insulation and for thin foils.

THE PRESENT INVENTION

According to my invention it has been quite surprising to find that di-cetylperoxydicarbonate has superior storage stability as compared with known peroxydicarbonate initiators. My new compound can be stored at room temperatures for long periods of time without danger of self ignition and the active peroxide content decreases only insignificantly. Another advantage of di-cetylperoxydicarbonate is that it is in solid form and is free flowing, thus enabling charging of the initiator to the polymerization zone without waste and in an easy manner. A further advantage is that the decomposition product formed when the initiator reacts under the formation of free radicals is cetyl alcohol, which is not unwholesome or noxious for human beings. Consequently, my initiator is suitable for the manufacture of plastic materials that are later applied as wrapping material for food.

Di-cetylperoxydicarbonate has also unexpectedly proved to have the property of considerably reducing the number of "fish eyes" compared to other initiators (such as di-tertiary-butyl cyclohexyl peroxydicarbonate). This means that the resins manufactured with di-cetylperoxydicarbonate are not rendered unfit for use in such applications as tile insulation and foils.

Di-cetyl peroxydicarbonate can be employed for the polymerization of ethylenically unsaturated monomers, vinyl aromatic compounds e.g. styrene, p-chlorostyrene, esters of aliphatic alpha-methylene mono carbon acids e.g. methylachylate, n-butyl acrylate, ethylacrylate, acryl acid nitrile, vinyl esters e.g. vinyl acetate, vinyl halides e.g. vinyl chloride, vinyl ethers e.g. vinyl methylethers, vinylidene halides e.g. vinylidene chloride, alpha-ethylenically unsaturated hydrocarbon such as ethylene, propylene, as well as unsaturated polyesters. The type of polymerization preferably may be a suspension polymerization or a mass polymerization.

The advantages of di-cetyl peroxydicarbonate as a rapid and effective initiator become particularly apparent in the manufacture of polyvinyl chloride. FIG. 1 compares the polymerization of vinyl chloride with (a) di-cetyl peroxydicarbonate as an initiator and (b) with the conventional dilauroyl peroxide as an initiator. When using di-cetyl peroxydicarbonate the polymerization time is reduced about one half in spite of the fact that only about one fourth as much di-cetyl peroxy dicarbonate was used.

I prefer to produce di-cetyl peroxydicarbonate by introducing liquid cetyl chloroformate under agitation to an alkaline aqueous solution of $H_2O_2$. When the reaction has been completed the resulting product comprises white solid granules.

The following examples more specifically illustrate my concepts relative to di-cetyl peroxydicarbonate.

EXAMPLE 1

A 1000 ml. three neck flask was charged with 500 ml. distilled water in which 32 g. of solid NaOH was dissolved. The temperature was regulated to 30° C. by means of a thermostatically controlled bath whereupon 40 g. of a 35% by weight aqueous solution of hydrogen peroxide was added. Under vigorous agitation 150 g. of cetyl-chloroformate was charged drop-wise over a period of about 20 minutes. After reaction for 1.5 hour the formed solid product was filtered off and after re-crystallization in carbon tetrachloride the product contained 98% by weight of peroxide calculated as di-cetyl peroxydicarbonate.

EXAMPLE 2

When storing various peroxydicarbonates at a temperature of 40° C. in a thermostatically controlled bath the following reduction of activity as a function of time was achieved:

| (-Peroxydicarbonate): | Reduction of activity at 40° C. |
|---|---|
| Isopropyl- | Explosive decomposition. |
| n-Butyl- | Complete decomposition after 24 hours. |
| 2-ethylhexyl- | Complete decomposition after 36 hours. |
| Cyclohexyl- | Complete decomposition after 24 hours. |
| Tert.-butylcyclohexyl- | 56% reduction of activity after 20 days. |
| Di-cetyl- | 4% reduction of activity after 20 days. |

EXAMPLE 3

In order to compare the "fish eye" properties of various polymerization initiators, PVC-resins prepared in an analogous manner except for the type of initiator, were admixed with a plasticizer, etc., according to the following recipe:

| | Parts by weight |
|---|---|
| PVC | 200 |
| Dioctylphthalate | 100 |
| Tribasic lead sulfate | 4 |
| Stearine | 0.25 |
| Soot (black) | 1 |

Each mixture was calendered at a temperature of 150° C. for 10 minutes whereupon the number of fish eyes per dm.$^2$ of the foil was determined.

| Initiator (-peroxydicarbonate): | Fish eyes, number/dm.$^2$ pcs. |
|---|---|
| Di-isopropyl | 70–100 |
| Di-tert.butylcyclohexyl | 75–90 |
| Di-cetyl- | 2–5 |

EXAMPLE 4

A stainless steel vessel was charged with 10 pounds of distilled water containing 5 grams of a suspension agent (partially hydrolyzed polyvinyl acetate), 5 grams of buffering agent (sodium bicarbonate) and 2.0 grams of initiator dicetylperoxidicarbonate. To this mixture was added 8 pounds of vinyl chloride and the suspension was agitated and heated to 50° C. The reaction mixture was maintained at this temperature for 9 hours, after which time 88% of the vinyl chloride had been converted to polyvinyl chloride with a K-value of 72 when measured using 1 g. polyvinyl chloride in 100 cc. cyclohexanone. The number of fish eyes was 4 per square decimeter.

EXAMPLE 5

A stainless steel vessel was charged with 10 pounds of distilled water containing 6 g. of a suspension agent polyvinyl alcohol and 1.5 g. of dicetylperoxidicarbonate. To the reaction vessel was then added 8 pounds of vinyl chloride. The reaction mixture was heated to 58° C. for 6 hours after which time the pressure had dropped to 3 kg./cm.$^2$. 91% of the vinyl chloride had been converted to polyvinyl chloride with a mean particle size of 0.1 mm. and a bulk density of 550 g./l. The amount of fish eyes was very low, only 2 per square decimeter.

EXAMPLE 6

0.5 percent dicetyperoxidicarbonate was added and dissolved in methyl methacrylate. The solution was poured into a dish 5 x 5 cm. and 1 cm. thick. The mold itself was 0.4 cm. thick and was maintained at a temperature of 30° C. for 2 days. A hard polymer with good transparency was prepared.

What I claim is:
1. The chemical compound di-cetyl peroxydicarbonate.

References Cited

UNITED STATES PATENTS 2,370,588  2/1945  Strain _____ 260—453
2,728,756  12/1955  Friedlander _____ 260—94.9

ELBERT L. ROBERTS, Primary Examiner

D. G. RIVERS, Assistant Examiner

U.S. Cl. X.R.

260—88.7 D, 89.1, 89.5 A, 89.5 AW, 91.1 M, 91.5, 91.7, 92.8 W, 92.8 R, 93.5 S, 93.5 W, 93.7, 94.9 CD